United States Patent [19]

Nakamura et al.

[11] Patent Number: 5,539,811
[45] Date of Patent: Jul. 23, 1996

[54] VISUAL COMMUNICATION TERMINAL APPARATUS FOR PERFORMING MULTIPLEX TRANSMISSION OF IMAGE AND AUDIO SIGNALS

[75] Inventors: Junji Nakamura; Toshihiro Nishimura, both of Fukuoka, Japan

[73] Assignee: Matsushita Electric Industrial Co., Ltd., Osaka, Japan

[21] Appl. No.: 226,591

[22] Filed: Apr. 12, 1994

[30] Foreign Application Priority Data

Apr. 13, 1993 [JP] Japan .................................. 5-086282

[51] Int. Cl.$^6$ ............................. H04M 11/00; H04N 7/12
[52] U.S. Cl. ................................ 379/94; 379/96; 348/14; 370/94.1
[58] Field of Search ........................ 379/93, 94, 96–100; 348/14–17; 370/110.1, 94.1

[56] References Cited

U.S. PATENT DOCUMENTS

| | | | |
|---|---|---|---|
| 4,998,248 | 5/1991 | Matsuzaki | 379/100 |
| 5,276,687 | 1/1994 | Miyamoto | 379/100 |
| 5,392,284 | 2/1995 | Sugiyama | 379/96 |

FOREIGN PATENT DOCUMENTS

| | | |
|---|---|---|
| 496562 | 3/1992 | Japan . |
| 4310055 | 11/1992 | Japan . |
| 548755 | 2/1993 | Japan . |

Primary Examiner—Wing F. Chan
Attorney, Agent, or Firm—Lowe, Price, LeBlanc & Becker

[57] ABSTRACT

A visual communication is performed between a calling party and a called party through a plurality of channels. After the parties are connected through a first channel, an available telephone number of a second channel stored in a BAS control portion is read to a TNI control portion on each of the parties, and the TNI control portions of the parties exchange the available telephone numbers. Thereafter, when an incoming call having a telephone number is received through the second channel by a call control processing portion of the called party, the telephone number of the call is compared with the available telephone number of the second channel by an ICJ portion. To perform correct visual communication between parties, in cases where the telephone number of the call agrees with the available telephone number, the call is established by the call control processing portion, and image and audio signals are transmitted from the calling party to the called party through codec portions, multiplexing/demultiplexing portions and the first and second channels to perform a visual communication. In contrast, in cases where the telephone number of the call does not agree with the available telephone number, the second channel is released.

15 Claims, 5 Drawing Sheets

FAS : FRAME ALIGNMENT SIGNAL
BAS : BIT-RATE ALLOCATION SIGNAL
SH  : SUB-CHANNEL

FIG. 4

EXAMPLE OF EXTENDED BAS CODE AFTER INTERCHANGE
(IN CASE OF USING 3 CHANNELS)

| 1 | 1 | 0 | 1 | 1 | 0 | 1 | 0 |

EXTENDED BAS — NUMBER OF INTERCHANGED TEL NO. (2 CHANNELS REMAIN)

| 0 | 0 | 0 | 0 | 1 | 0 | 0 | 1 | 09
| 0 | 0 | 1 | 0 | 0 | 1 | 0 | 0 | 24
| 0 | 0 | 0 | 1 | 0 | 0 | 0 | 1 | 11    092-411-1112
| 0 | 0 | 0 | 1 | 0 | 0 | 0 | 1 | 11
| 0 | 0 | 0 | 1 | 0 | 0 | 1 | 0 | 12

| 1 | 1 | 1 | 1 | 0 | 0 | 0 | 0 | DELIMITER

| 0 | 0 | 0 | 0 | 1 | 0 | 0 | 1 | 09
| 0 | 0 | 1 | 0 | 0 | 1 | 0 | 0 | 24
| 0 | 0 | 0 | 1 | 0 | 0 | 0 | 1 | 11    092-411-1113
| 0 | 0 | 0 | 1 | 0 | 0 | 0 | 1 | 11
| 0 | 0 | 0 | 1 | 0 | 0 | 1 | 1 | 13

| 1 | 1 | 1 | 1 | 0 | 0 | 0 | 0 | DELIMITER

FIG. 5

VISUAL COMMUNICATION TERMINAL APPARATUS FOR PERFORMING MULTIPLEX TRANSMISSION OF IMAGE AND AUDIO SIGNALS

BACKGROUND OF THE INVENTION

1. Field of the Invention

This invention relates to a visual communication terminal (namely, an image terminal or a video terminal) having a function of performing a multiplex transmission of images (namely, still and moving images), sound, audio, text or the like by using communication circuits.

2. Description of the Related Art

When conventional visual communication terminals communicate information generated by using multimedia including images, sound, audio, text or the like, a user of one of the terminals (hereunder sometimes referred to as a calling terminal) first sets a telephone number of the other terminal (hereunder sometimes referred to as a called terminal) in a keying portion of the calling terminal by keying the number. Thereafter, when a telephone-number transmission key is pushed, a call control processing portion of the calling terminal performs an operation of connecting the calling and called terminal with a communication circuit through a network interface portion. Then, what is called a communication rate (namely, a communication speed or transmission speed) of sound information is inputted from the keying portion according to the CCITT (Consultative Committee for International Telephone and Telegraph) Recommendation H. 221. Further, the allocation of communication circuits to channels, as well as the frame structure of each of information signals representing sound information, image information and character information, is determined according to the inputted communication rate. Next, according to the BAS (Bit-rate Allocation Signals) code of the CCITT Recommendation H. 241, the frame structure used in and the capability of each terminal are interchanged between the calling and called terminals and moreover, the communication mode of communication therebetween is indicated.

In case where the conventional visual communication terminals communicate with each other by using a plurality of communication circuits, the aforesaid process is repeatedly performed plural times, the number of which is equal to that of the communication circuits. Thus, the conventional visual communication terminals are connected with the communication circuits and communicate information generated by using multimedia which includes images, sound, audio, text or the like (namely, perform what is called multimedia communications).

Further, for example, in the Japanese Unexamined Patent Publication (Kokai Tokkyo Koho) Official Gazette No. H4-96562, there has been proposed a conventional method. Namely, in case of this conventional method, when a call originated from a calling terminal is established on a first circuit connected between the calling terminal and a called terminal, the called terminal transmits a telephone number thereof corresponding to another available circuit (namely, a second circuit) connected thereto, on which no call is established, to the calling terminal by using the first circuit. Then, when the calling terminal receives the telephone number corresponding to the second circuit, the calling terminal automatically dials the received telephone number to thereby establish a call on the second circuit between the calling and called terminals (namely, between calling and called parties).

SUMMARY OF THE INVENTION

It is an object of the present invention to provide a visual communication terminal, connected to a plurality of circuits, which terminal can judge whether or not a plurality of incoming calls are originated from a same calling terminal (namely, a same calling party), to thereby establish a plurality of calls between a user thereof and an intended party.

To achieve the foregoing object, and in accordance with an aspect of the present invention, there is provided a visual communication terminal which comprises a network interface portion for controlling communications through communication lines, a call control processing portion for controlling a call through the network interface portion, a telephone-number interchange control portion for interchanging with a destination visual communication terminal a telephone number, by which the destination visual communication terminal can be communicated therewith through the call control processing portion, and for storing a telephone number of the destination visual communication terminal, by which the destination visual communication terminal can be communicated therewith, an incoming-call judgment portion for judging from the telephone number stored in the telephone-number interchange control portion and a calling-party number of a call set-up message newly received through the call control processing portion whether or not a calling party whose call has been established on a first channel is the same as a calling party whose call is received from a second channel later, a multiplexing/demultiplexing portion for multiplexing an image signal and an audio signal, for transmitting the multiplexed signals through the network interface portion and for separating multiplexed signals received from the network interface portion into an image signal and an audio signal and a codec (namely, a code and encoder) portion for encoding image information and audio information, for transmitting a generated code to the multiplexing/demultiplexing portion, for decoding image and audio signals received from the multiplexing/demultiplexing portion and for generating an image and a sound.

With the aforementioned configuration, after a call is established on a first channel, the visual communication terminal of the present invention checks the communicating capability of a destination visual communication terminal which also checks the communicating capability of the visual communication terminal of the present invention. If each of the communication terminals can communicate by using a plurality of channels, the communication terminals interchange telephone numbers, by which communications therebetween can be realized, with each other and store the interchanged telephone numbers. Then, the visual communication terminal of the present invention judges from the telephone number interchanged through a first channel or circuit and a calling-party number of a call set-up message newly received through a second channel or circuit whether or not a calling party whose call has been established on the first channel is the same as a calling party whose call is received from the second channel later (namely, whether or not the telephone number of the calling party whose call is received through the second channel later is the same as one of the telephone numbers interchanged with the destination visual communication terminal). Thereby, even in case where the visual communication terminal of the present invention receives incoming calls serially from a plurality of channels in case of communicating with other visual communication terminals by using the plurality of channels, the visual communication terminal of the present invention can judge whether or not an incoming call is sent from the same calling party as the calling party of the call established on the first channel.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, a visual communication terminal embodying the present invention (namely, the preferred embodiment of the present invention) will be described in detail by referring to the accompanying drawings.

Figure 1:
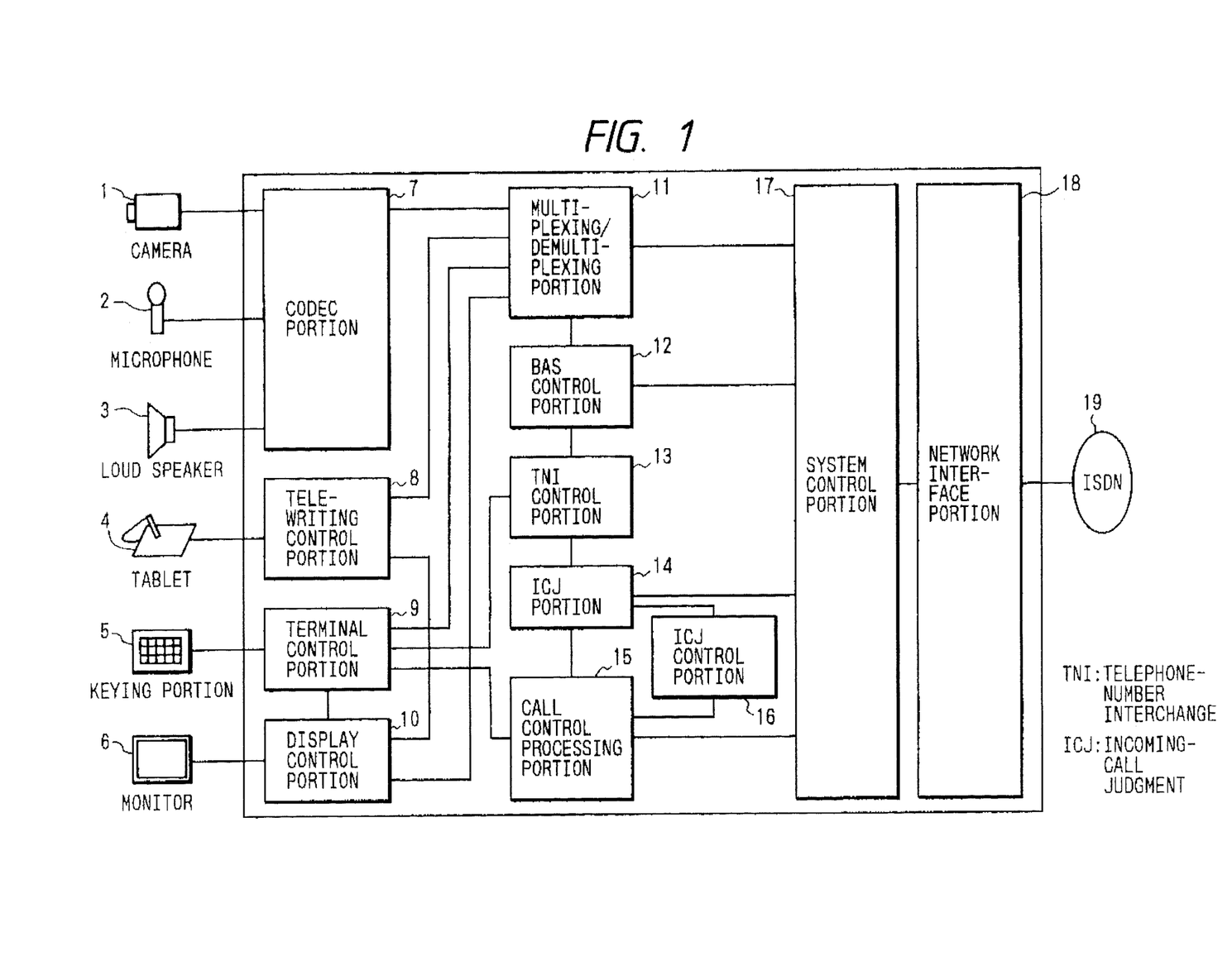
FIG. 1 is a schematic block diagram for illustrating the configuration of a visual communication terminal embodying the present invention (namely, the embodiment of the present invention)
Figure 2:
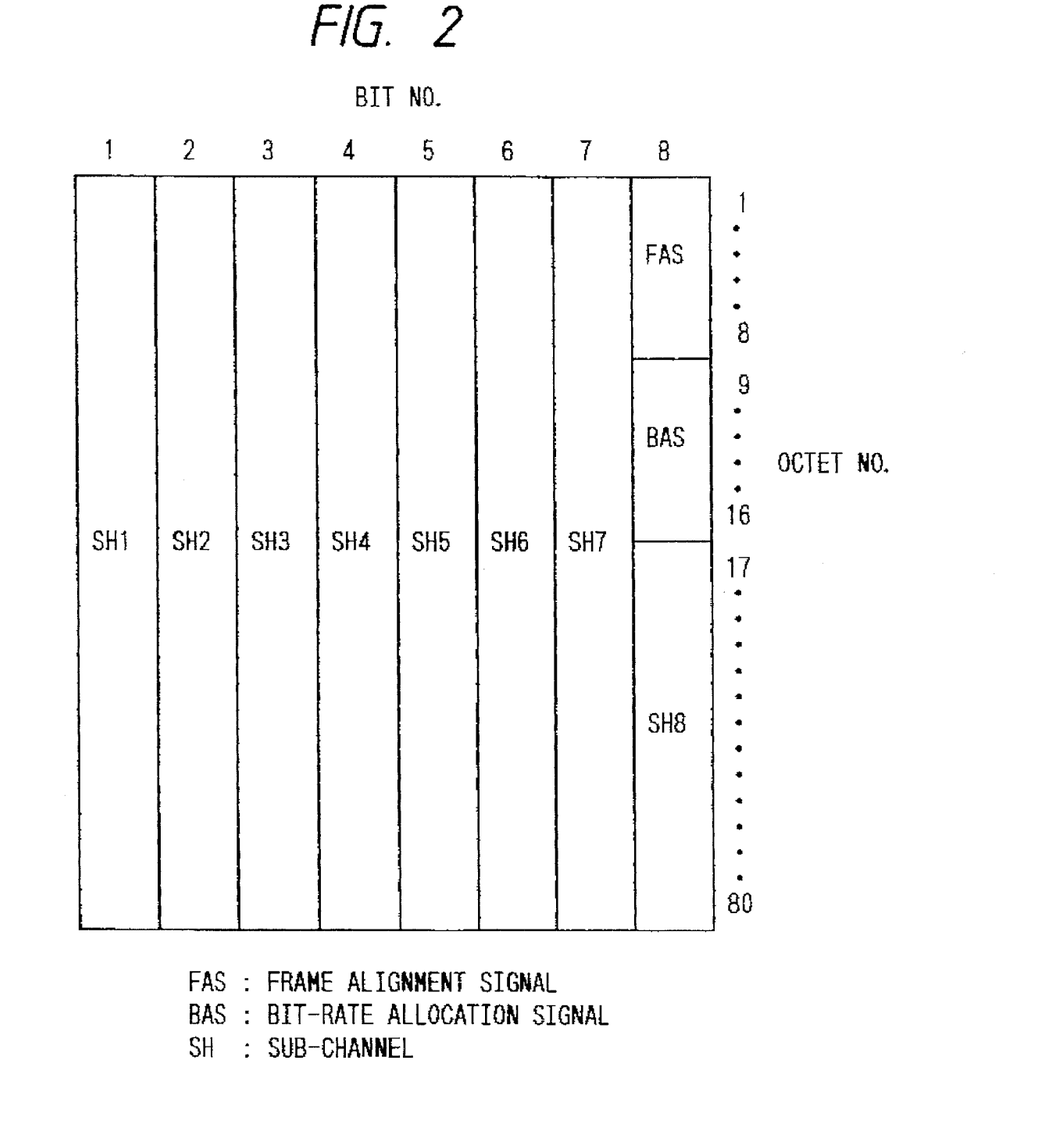
FIG. 2 is a diagram for illustrating an example of the frame format of a signal representing an image, sound, audio, text, drawing or the like, which format is based on the CCITT Recommendation and is employed by the embodiment of the present invention.

FIG. 1 is a schematic block diagram for illustrating the configuration of the visual communication terminal embodying the present invention. In this figure, reference numeral 1 designates a camera for taking a picture; 2 a microphone for inputting a voice; 3 a loudspeaker for outputting a voice; 4 a tablet for inputting handwritten characters and drawings; 5 a keying portion for inputting a telephone number and for selecting a function; 6 a monitor display (hereunder sometimes referred to simply as a monitor) for displaying an image to be sent therefrom and another image sent from a destination visual communication terminal; 7 a codec portion for performing a compression coding to convert image information inputted from the camera 1 and audio information inputted from the microphone 2 according to a predetermined coding method into an image signal and an audio signal at an indicated communication rate, for performing an expansion decoding on coded image and audio signals which are received from another visual communication terminal, and for outputting an image obtained as the result of the decoding to the monitor 6 and also outputting an obtained voice to the loudspeaker 3; 8 a telewriting control portion for converting input information sent from the tablet 4, which represents handwritten characters and drawings, into signals to display the characters and drawings on the screen of the monitor 6; 9 a terminal control portion for controlling the terminal according to input data inputted from the keying portion 5; 10 a display control portion for changing or controlling the displaying of an image on the screen of the monitor 6 according to instructions or commands from the terminal control portion 9; 11 a multiplexing/demultiplexing portion for multiplexing image, audio, text and drawing signals according to the frame format of the CCITT Recommendation H.221 (regarding a frame structure of signals transmitted on a channel at at a transmission rate within the range from 64 kilo-bits/second to 1920 kilo-bits/second (kbit/s), which is employed in audio-visual teleservice as illustrated in FIG. 2) and for separating a reception signal multiplexed according to the CCITT Recommendation H.221 into signals representing an image, audio, text and drawing or the like; 12 a BAS control portion for performing a communication procedure based on the CCITT Recommendation H. 242 (regarding a method for setting a communication between digital audio-visual terminals using digital channels, the transmission rates of which are up to 1920 kbit/s); 13 a telephone-number interchange control portion for inserting the telephone number into an extended BAS code obtained by uniquely defining a BAS code area which is not defined according to the CCITT Recommendation, for reading an available telephone number from the extended BAS code, for interchanging available telephone numbers with other terminals and for storing the available telephone numbers; 14 an incoming call judgement portion for comparing the telephone number, which is stored in the telephone-number interchange control portion after a first call is established on a circuit or channel, with a calling-party number of a call set-up message received through another circuit; 15 a call control processing portion for managing call terminating, originating and disconnecting or the like; 16 an incoming-call judgment control portion for detecting a result of the comparison made in the incoming-call judgement portion 14 and for notifying the call control processing portion 15, if not matched, to transmit a circuit release completion message indicating that a circuit or line is released; 17 a system control portion for managing the entire system; 18 a network interface portion for controlling a connection with a communication circuit or line of an integrated services digital network (ISDN) and a communication with the ISDN; and 19 the ISDN.

Hereinafter, an operation of the visual communication terminal embodying the present invention will be described in detail by referring to the drawings.

Figure 3:
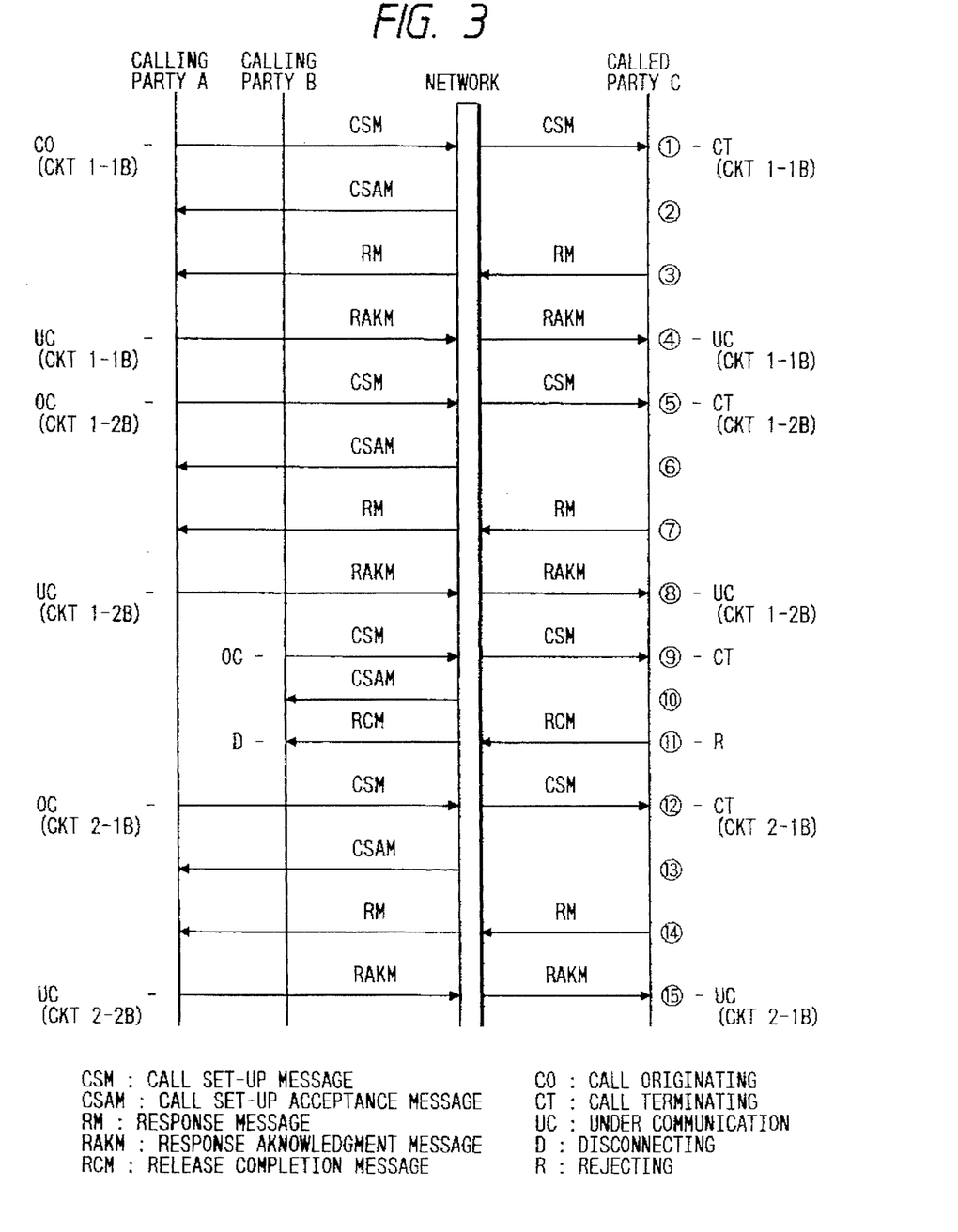
FIG. 3 is a diagram for illustrating a sequence of steps of a process of connecting communication circuits between visual communication terminals embodying the present invention.

FIG. 3 is a diagram for illustrating a sequence of steps of a process of connecting communication circuits between visual communication terminals embodying the present invention. The sequence of steps of the process of connecting communication circuits is performed according to the CCITT Recommendation. In this figure, characters A, B and C denote a first calling party, a second calling party and a called party, respectively. In the following description, each of parts of the visual communication terminal of the calling party A is indicated by adding character A to the right side of corresponding reference numeral. Similarly, each of parts of the visual communication terminal of the called party C is indicated by adding character C to the right side of corresponding reference numeral. Further, in the following description, it is assumed that there are three communication circuits or lines which can be used for making a communication between the calling party A and the called party C.

First, the calling party A inputs predetermined information representing a destination telephone number, a selected communication function and the like, which are necessary for a call origination, from the keying portion 5A. The information inputted by the calling party A is then notified of through the terminal control portion 9A to the call control processing portion 15A. Subsequently, the call control processing portion 15A generates a call set-up message containing predetermined information which represents the destination telephone number, a kind of a communication signals (for example, telephone, image or data communication) and the like. Further, the call control processing portion 15A transmits the generated call set-up message to the ISDN 19 through the system control portion 17A and the network interface portion 18A. When receiving the call set-up message, the ISDN 19 notifies the visual communication terminal used by the called party C of the call set-up message (see ①). Further, the ISDN 19 notifies the visual communication terminal used by the calling party A of a call set-up acceptance message indicating that the call set-up message is surely received (see ②). Then, the call control processing portion 15C of the called party C analyzes the received call set-up message into the telephone number of the calling party and the kind of the communication and the like. If a communication can be made between the calling and called parties by using the destination telephone number, the visual communication terminal of the called party C transmits through the ISDN 19 to the visual communication terminal of the calling party A a response message indicating that a communication is permitted (see ③). When receiving the response message, the call control processing portion 15A of the calling party A transmits through the ISDN 19 to the visual communication terminal of the called party C a response acknowledgment message indicating that the response message is received by the calling party A (see ④). At that time, the call control processing portion 15A of the calling party A analyzes the received response message and thus knows whether or not a communication is allowed by the visual communication terminal of the called party C. If permitted, a call is established on a first channel. Thereafter, the first channel is available for making a communication therebetween.

Figure 4:
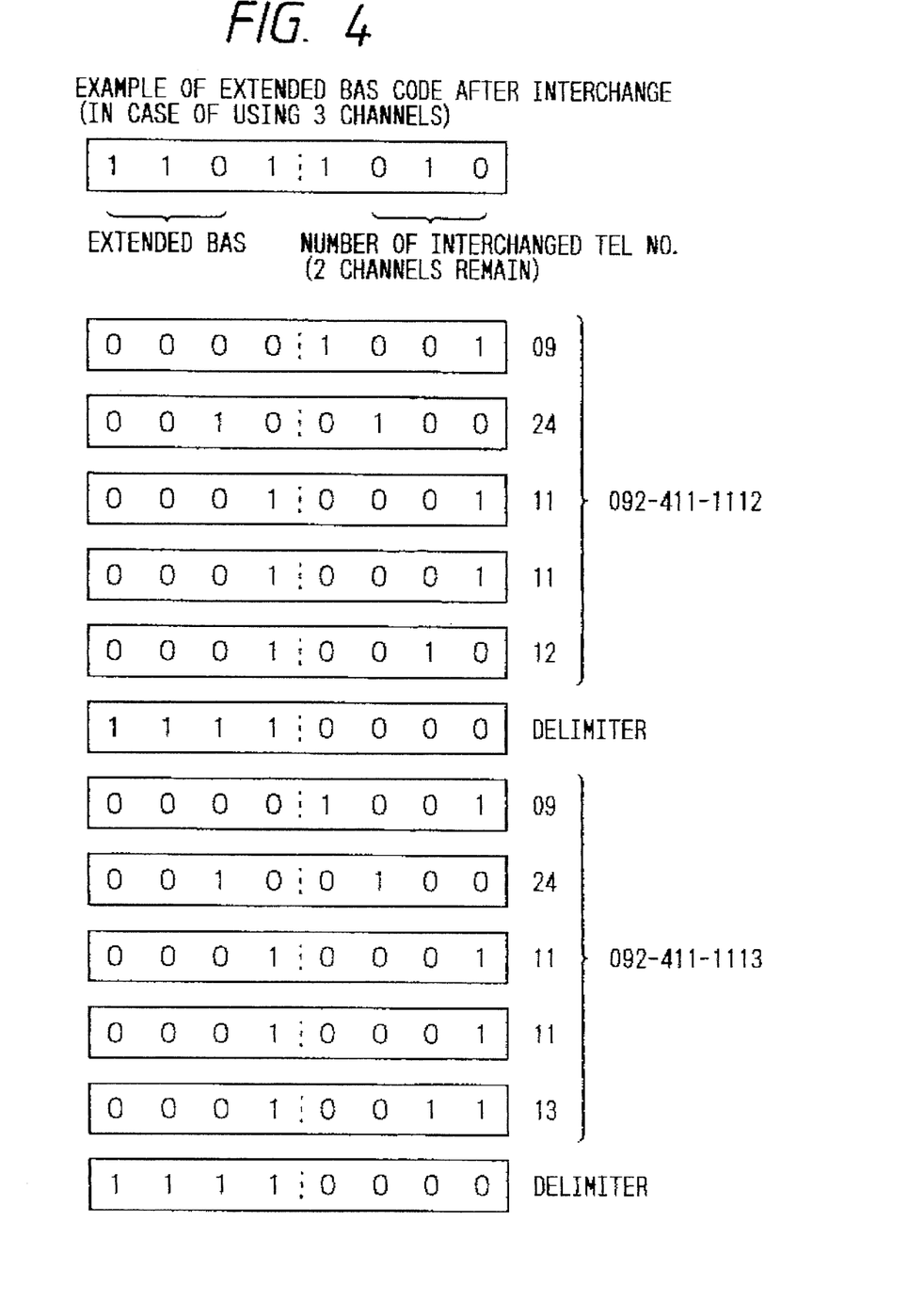
FIG. 4 is a diagram for illustrating an example of a set of codewords of an extended BAS code to be used for interchanging telephone numbers between visual communication terminals embodying the present invention.

When a call is established on the first channel, the BAS control portions 12A and 12C of the visual communication terminals of the calling and called parties check the functions and communication capabilities of each other. If both of the visual communication terminals can communicate with each other by using a plurality of channels, the BAS control portions 12A and 12C and the telephone-number interchange control portions 13A and 13C set the telephone numbers corresponding to the predetermined plurality of channels in the BAS code extended as illustrated in FIG. 4 and interchange the telephone numbers with each other. Further, the telephone-number interchange control portion 13A stores the available telephone numbers of the called party C and on the other hand, the telephone-number interchange control portion 13C stores the available telephone numbers of the calling party A.

Here, an example of a set of codewords of the extended BAS code to be used for interchanging the telephone numbers will be described with reference to FIG. 4. FIG. 4 is a diagram for illustrating the example of a set of codewords of the extended BAS code to be used for interchanging the telephone numbers therebetween. As illustrated in this figure, the high-order three bits (110) of a first byte indicate that this code is an extended BAS code. Further, the low-order three bits of the first byte represent the number of additional circuits which are available for a communication therebetween. In case that additional two circuits corresponding to the telephone numbers 092-411-1112 and 092-411-1113 are available as in this case, the low-order three bits are (010).

Thus, for example, the bits (11011010) are coded as the first byte. Next, the telephone number 092-411-1112 is divided from the highest numeral every two digits into five two-digit decimal numbers 09, 24, 11, 11 and 12. Further, each of these decimal numbers is coded or represented by using eight bits (incidentally, the high order four bits represent a high order digit of each of the decimal numbers and the low order four bits represent a low order digit of each of the decimal numbers) as (00001001), (00100100), (00010001), (00010001) and (00010010). Subsequently, the byte coded as (11110000) is used as a delimiter. Next, similarly, the other telephone number 092-411-1113 is divided from the highest numeral every two digits into five two-digit decimal numbers. Further, each of these decimal numbers is coded or represented by using eight bits, similarly as in case of the telephone number 092-411-1112. Thus (00001001), (00100100), (00010001), (00010001) and (00010011) are obtained. Subsequently, the byte coded as (11110000) is similarly used as a delimiter.

When receiving a next incoming call (namely, a second incoming call), the call control processing portion 15C of the visual communication terminal of the called party C analyzes a call set-up message received at that time and notifies the incoming call judgment portion 14C of the telephone number of a calling party (see ⑤ of FIG. 3). Subsequently, the ISDN 19 notifies the visual communication terminal used by the calling party of a call set-up acceptance message indicating that the call set-up message is surely received by the visual communication terminal of the called party (see ⑥). Then, the incoming-call judgment portion 14C compares the telephone number of the calling party notified of from the call control processing portion 15C with each of the destination telephone numbers stored in the telephone-number interchange control portion 13C. If matched, the incoming-call judgment portion 14C regards this incoming call as an incoming call sent from an intended called party and moreover transmits through the call control processing portion 15C to the destination visual communication terminal (namely, in this case, the visual communication terminal of the calling party A) a response message indicating that the visual communication terminal of the called party permits the terminal of the calling party to communicate therewith (see ⑦). Then, the call control processing portion 15A of the visual communication terminal of the calling party A analyzes the response message and detects the permission to communicate with the visual communication terminal of the called party C. Moreover, the call control processing portion transmits through the ISDN 19 to the visual communication terminal of the called party C a response acknowledgement message indicating that the response message is surely received (see ⑧). Thus, a call is established on a second channel. Thereafter, the second channel is available for making a communication therebetween.

When receiving a third incoming call subsequent to the second incoming call, the call control processing portion 18C of the visual communication terminal of the called party C analyzes a call set-up message received this time and notifies the incoming call judgment portion 14C of the telephone number of a calling party (see ⑨). Then, the ISDN 19 notifies the visual communication terminal used by the calling party of a call set-up acceptance message indicating that the call set-up message is securely received by the visual communication party of the called party (see ⑩). Subsequently, the incoming-call judgment portion 14C compares the telephone number of the calling party notified of from the call control processing portion 15C with each of the destination telephone numbers stored in the telephone-number interchange control portion 13C. If it is detected that there is no match, the incoming-call judgment portion 14C regards this incoming call as an incoming call sent from a party (in this case, the calling party B) other than the intended called party and moreover transmits through tile call control processing portion 15C to the destination visual communication terminal (namely, in this case, the visual communication terminal of the calling party B) a release completion message and disconnects this call from the visual communication terminal of the called party (see ⑪). At that time, the call control processing portion 15C may disregard the call sent from the visual communication terminal of the calling party B.

Thereafter, when receiving still another incoming call (namely, a fourth incoming call) subsequent to the third incoming call, the call control processing portion 15C of the visual communication terminal of the called party C analyzes a call set-up message received this time and notifies the incoming call judgment portion 14C of the telephone number of a calling party (see ⑫ of FIG. 3). Subsequently, the ISDN 19 notifies the visual communication terminal used by the calling party of a call set-up acceptance message indicating that this call set-up message is surely received by the visual communication terminal of the called party (see ⑬). Then, the incoming-call judgment portion 14C compares the telephone number of the calling party notified of from the call control processing portion 15C with each of the destination telephone numbers stored in the telephone-number interchange control portion 13C. If matched, the incoming-call judgment portion 14C regards this incoming call as an incoming call sent from an intended called party and further transmits through the call control processing portion 15C to the destination visual communication terminal (namely, in this case, the visual communication terminal of the calling party A) a response message indicating that the visual communication terminal of the called party allows the terminal of the calling party to communicate therewith (see ⑭). Then, the call control processing portion 15A of the visual communication terminal of the calling party A analyzes the response message and detects the permission to communicate with the visual communication terminal of the called party C. Furthermore, the call control processing portion 15A transmits through the ISDN 19 to the visual communication terminal of the called party C a response acknowledgement message indicating that the response message is surely received (see ⑮). Thus, this call is established on a third channel. Consequently, the calls, the number of which is equal to that of the available channels (or circuits) interchanged through the first channel, are established. Thereafter, the channels of such a number are available for making communications therebetween. As the result of performing the aforesaid procedure, a plurality of calls from a same calling party are established on a plurality of channels. Further, the visual communication terminals communicate with each other by using a plurality of channels.

Figure 5:
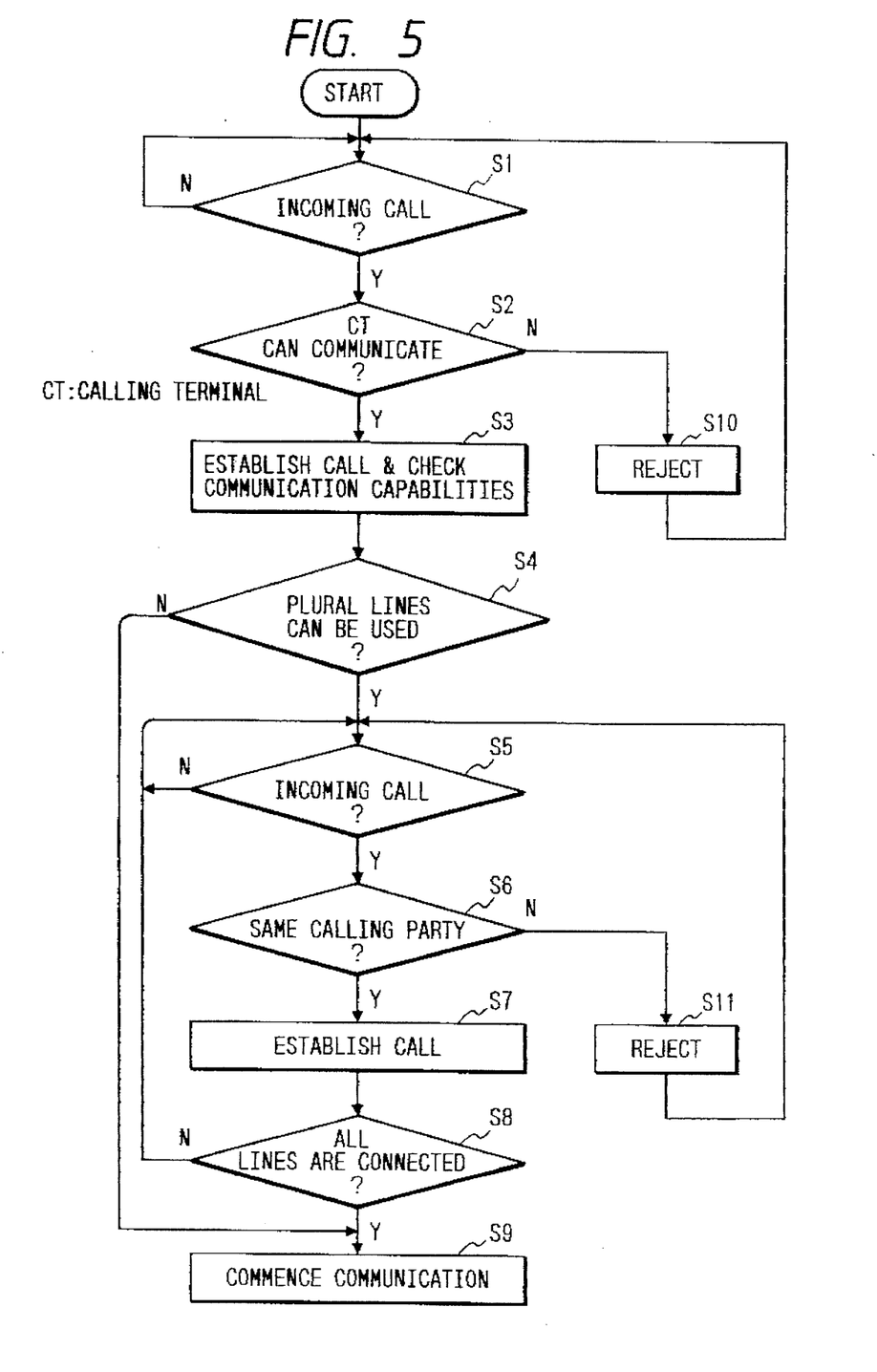
FIG. 5 is a flowchart of a program for performing an operation of connecting communication circuits between visual communication terminals embodying the present invention.

Hereinafter, the operation of the visual communication terminal embodying the present invention will be further described in detail by referring to the flowchart of the program for performing the operation. FIG. 5 is a flowchart of a program for performing the operation of connecting communication circuits (or lines) between visual communication terminals embodying the present invention. Incidentally, the sequence of steps for connecting communication circuits (or lines) therebetween are performed on the basis of the CCITT Recommendation.

Namely, in step S1, the visual communication terminal awaits a first incoming call. If there is an incoming call, the program advances to step S2. Then, in step S2, the terminal of the called party analyzes a call set-up message and judges whether or not the visual communication terminal of the calling party has a capability of communicating with the visual communication terminal of the called party. If the terminal of the calling party has such a capability, the program advances to step S3. In contrast, if not, the program advances to step S10. In step S3, the call is established and each of the visual communication terminals respectively corresponding to the calling and called parties checks the functions and communication capabilities of the other terminal. If each of the visual communication terminals respectively corresponding to the calling and called parties can communicate by using a plurality of channels, these terminals interchange predetermined plurality of telephone numbers preliminarily set in each of the terminals with each other. Then, the program goes forward to step S4 whereupon it is judged whether or not a communication can be made by using a plurality of channels. If possible, the program advances to step S5 through Y-branch. If a communication is made by a single channel, the program advances to step S9 through N-branch. Meanwhile, in step S5, the visual communication terminal of the called party awaits a next incoming call. If there is the next incoming call (namely, a second incoming call), the program advances to step S6 whereupon the visual communication terminal of the called party analyzes a call set-up message received this time and compares a telephone number indicated by this call set-up message with each of the telephone numbers checked and interchanged in step S3. If matched, the program goes to step S7 through Y-branch. In contrast, if not matched, the program advances to step S11 through N-branch. In step S7, the terminal establishes this call. Subsequently, the program goes forward to step S8 whereupon it is judged whether or not a call is established on each of the circuits (or lines) corresponding to the telephone numbers checked and interchanged in step S3. If, among these circuits, there is a circuit on which no call is established, the program goes back to step S5. In contrast, if calls are established on all of the circuits corresponding to the telephone numbers checked and interchanged in step S3, the program advances to step S9 whereupon the visual communication terminals commence a communication therebetween.

Meanwhile, in step S10, the visual communication terminal of the called party transmits a release completion message to the calling party. Thereby, the visual communication terminal of the called party rejects the incoming call sent from the calling party. Then, the program goes back to step 1. Similarly, in step S11, the visual communication terminal of the called party transmits a release completion message to the calling party to thereby reject the incoming call sent from the calling party. Then, the program goes back to step 5. As the result of performing the aforementioned process according to the flowchart of FIG. 5, calls issued from the same calling party are established on a plurality of channels. Consequently, the visual communication terminals of the present invention communicate with each other by using the plurality of channels.

While the preferred embodiment of the present invention has been described above, other various embodiments of the present invention may be made without changing the spirit or essential characteristics thereof. The foregoing description of the preferred embodiment of the present invention is, accordingly, for illustrative purposes only. Thus it is to be understood that the present invention is not limited thereto. The scope of the present invention, therefore, is to be determined by the appended claims rather than the description preceding them. All changes and modifications covered by the appended claims fall within the scope of the present invention.

What is claimed is:

1. A visual communication terminal apparatus for communicating between a first calling party and a called party connected through a first channel, comprising at each called and calling party:

network interface means for transmitting at a first calling party, to the called party through the first channel, a piece of particular identifying information of a second channel differing from the first channel;
   for receiving, at the called party, the piece of particular identifying information of the second channel transmitted from the first calling party through the first channel;
   for transmitting, at the first calling party or at a second calling party, a call to the called party through the second channel; and
   for receiving, at the called party, the call transmitted from the first calling party or from the second calling party through the second channel;

identifying information controlling means for preparing, at the first calling party, the piece of particular identifying information transmitted to the called party through the network interface means of the first calling party and the first channel;
   for preparing, at the second calling party, a piece of general identifying information of the second channel for transmission to the called party through the network interface means of the second calling party; and
   for storing, at the called party, the piece of particular identifying information of the second channel transmitted from the first calling party to the called party through the network interface means of the first calling party and the first channel;

call control processing means for preparing, at the first calling party or at the second calling party, the call transmitted to the called party;
   for adding, at the first calling party, the piece of particular identifying information of the second channel to the call in cases where the call is prepared at the first calling party;
   for adding, at the second calling party, the piece of general identifying information of the second channel to the call in cases where the call is prepared at the second calling party;
   for receiving, at the called party, the call prepared at the first calling party or at the second calling party through the second channel and the network interface means of the called party;
   for disconnecting the call in cases where a release of the second channel is notified; and
   for establishing the call in cases where an establishment of the call is notified;

incoming-call judging means for comparing, at the called party, a received piece of identifying information of the second channel added to the call received by the call control processing means of the called party with the particular identifying information stored in the identifying information controlling means of the called party; and
   for judging, at the called party, whether or not the received piece of identifying information received by the call control processing means of the called party agrees with the particular identifying information stored in the identifying information controlling means of the called party;

incoming-call judgement controlling means for notifying the call control processing means of the called party of the release of the second channel in cases where the incoming-call judging means of the called party judges that the received piece of identifying information does not agree with the particular identifying information stored in the identifying information controlling means of the called party; and
   for notifying the call control processing means of the called party of the establishment of the call at the called party in cases where the incoming call judging means judges that the received piece of identifying information agrees with the particular identifying information stored in the identifying information controlling means of the called party; and information communicating means for transmitting, at the first calling party, one or more pieces of visual information to the called party through the network interface means and the first and second channels in cases where the call control processing means establishes the call transmitted through the second channel and
   for receiving, at the called party, the visual information from the first calling party through the network interface means and the first and second channels to perform a visual communication between the first calling party and the called party.

2. A visual communication terminal apparatus according to claim 1, wherein the information communicating means comprises:

codec means for coding, at the first calling party, an image signal and an audio signal indicating the visual information to produce a coded image signal and a coded audio signal, and
   for decoding, at the called party, the coded image signal and the coded audio signal to reproduce the image signal and the audio signal; and multiplexing/demultiplexing means for multiplexing the coded image signal and the coded audio signal produced by the codec means at the first calling party to transmit multiplexed coded image and audio signals to the called party through the network interface means and the first and second channels, and
   for demultiplexing, at the called party, the multiplexed coded image and audio signals transmitted from the first calling party through the network interface means and the first and second channels, the demultiplexed coded image and audio signals being decoded by the codec means.

3. A visual communication terminal apparatus according to claim 1, wherein the identifying information controlling means comprises:

bit-rate allocation signal controlling means for storing, at both the first calling party and the called party, a plurality of pieces of identifying information of a plurality of available channels in a bit-rate allocation signal code area in bit-rate allocation signal code form; and identifying information interchange controlling means for reading, at the first calling party, a piece of identifying information of the second channel selected from among the available channels from the bit-rate allocation signal controlling means as the particular identifying information of the second channel;
   for reading, at the called party, a piece of called-identifying information of the second channel selected from among the available channels from the bit-rate allocation signal controlling means;

for storing, at the called party, the particular identifying information transmitted from the first calling party to the called party through the network interface means and the first channel; and for storing, at the first calling party, the called-identifying information transmitted from the called party to the first calling party through the network interface means and the first channel.

4. A visual communication terminal apparatus according to claim 1 wherein the identifying information controlling means comprises:

bit-rate allocation signal controlling means for storing, at both the first calling party and the called party, a plurality of pieces of identifying information of a plurality of available channels and the number of available channels in a bit-rate allocation signal code area in bit-rate allocation signal code form; and identifying information interchange controlling means for reading, at the first calling party, a piece of identifying information of the second channel selected from among the available channels from the bit-rate allocation signal controlling means as the particular identifying information of the second channel;

for reading, at the called party, a piece of called-identifying information of the second channel selected from among the available channels from the bit-rate allocation signal controlling means;

for storing, at the called party, the particular identifying information transmitted from the first calling party to the called party through the network interface means and the first channel; and for storing, at the first calling party, the called-identifying information transmitted from the called party to the first calling party through the network interface means and the first channel.

5. A visual communication terminal apparatus according to claim 1 wherein the particular identifying information prepared by the identifying information controlling means at the first calling party is a particular telephone number of the second channel.

6. A visual communication terminal apparatus for communicating between a first calling party and a called party connected through a first channel, comprising at each called and calling party:

network interface means for transmitting at a first calling party, to the called party through the first channel, a piece of particular identifying information of a second channel differing from the first channel;

for receiving, at the called party, the piece of particular identifying information of the second channel transmitted from the first calling party through the first channel;

for transmitting, at the called party, a particular telephone number of the second channel to the first calling party through the first channel;

for receiving, at the first calling party, the particular telephone number of the second channel transmitted from the called party through the first channel;

for transmitting, at the first calling party or at a second calling party, a call to the called party according to the particular telephone number of the second channel through the second channel; and for receiving, at the called party, the call transmitted from the first calling party or the second calling party through the second channel;

identifying information controlling means for preparing, at the called party, the particular telephone number transmitted to the first calling party through the network interface means;

for preparing, at the first calling party, the piece of particular identifying information transmitted to the called party through the network interface means of the first calling party and the first channel;

for preparing, at the second calling party, a piece of general identifying information of the second channel for transmission to the called party through the network interface means of the second calling party;

for storing, at the first calling party, the particular telephone number transmitted from the called party to the first calling party through the network interface means and the first channel; and for storing, at the called party, the piece of particular identifying information transmitted from the first calling party to the called party through the network interface means of the first calling party and the first channel;

call control processing means for preparing, at the first calling party or at the second calling party, the call transmitted to the called party;

for adding, at the first calling party, the piece of particular identifying information of the second channel to the call in cases where the call is prepared at the first calling party;

for adding, at the second calling party, the piece of general identifying information of the second channel to the call in cases where the call is prepared at the second calling party;

for receiving, at the called party, the call prepared at the first calling party or at the second calling party through the second channel and the network interface means of the called party;

for disconnecting the call in cases where a release of the second channel is notified; and for establishing the call in cases where an establishment of the call is notified;

incoming-call judging means for comparing, at the called party, a received piece of identifying information of the call received by the call control processing means of the called party with the particular identifying information stored in the identifying information controlling means of the called party; and for judging, at the called party, whether or not the received piece of identifying information of the call received by the call control processing means of the called party agrees with the particular identifying information stored in the identifying information controlling means of the called party;

incoming-call judgement controlling means for notifying the call control processing means of the called party of the release of the second channel in cases where the incoming-call judging means of the called party judges that the received piece of identifying information of the call received by the call control processing means of the called party does not agree with the particular identifying information stored in the identifying information controlling means of the called party; and for notifying the call control processing means of the called party of the establishment of the call at the called party in cases where the incoming call judging means judges that the received piece of identifying information of the call received by the call control processing means of the called party agrees with the particular identifying information stored in the identifying information controlling means of the called party; and information communicating means for transmitting, at the first calling party, one or more pieces of visual information to the called party through the network interface means and the first and second channels in cases where the call control processing means establishes the call transmitted through the second channel and for receiving, at the called party, the visual information from the first calling party through the network interface means and the first and second channels to perform a visual communication between the first calling party and the called party.

7. A visual communication terminal apparatus according to claim 6, wherein the information communicating means comprises:

codec means for coding, at the first calling party, an image signal and an audio signal indicating the visual information to produce a coded image signal and a coded audio signal, and for decoding, at the called party, the coded image signal and the coded audio signal to reproduce the image signal and the audio signal; and multiplexing/demultiplexing means for multiplexing the coded image signal and the coded audio signal produced by the codec means at the first calling party to transmit multiplexed coded image and audio signals to the called party through the network interface means and the first and second channels, and for demultiplexing, at the called party, the multiplexed coded image and audio signals transmitted from the first calling party through the network interface means and the first and second channels, the demultiplexed coded image and audio signals being decoded by the codec means.

8. A visual communication terminal apparatus according to claim 6, wherein the identifying information controlling means comprises:

bit-rate allocation signal controlling means for storing, at the first calling party, a plurality of pieces of identifying information of a plurality of available channels in a bit-rate allocation signal code area in bit-rate allocation signal code form;

for storing, at the called party, a plurality of telephone numbers of the available channels in a bit-rate allocation signal code area in bit-rate allocation signal code form; and identifying information interchange controlling means for reading, at the first calling party, a piece of identifying information of the second channel selected from among the available channels from the bit-rate allocation signal controlling means as the particular identifying information of the second channel;

for reading, at the called party, a telephone number of the second channel selected from among the available channels from the bit-rate allocation signal controlling means as the particular telephone number of the second channel;

for storing, at the called party, the particular identifying information transmitted from the first calling party to the called party through the network interface means and the first channel; and for storing, at the first calling party, the particular telephone number transmitted from the called party to the first calling party through the network interface means and the first channel.

9. A visual communication terminal apparatus according to claim 6 wherein the identifying information controlling means comprises:

bit-rate allocation signal controlling means for storing, at the first calling party, a plurality of pieces of identifying information of a plurality of available channels and the number of identifying information in a bit-rate allocation signal code area in bit-rate allocation signal code form;

for storing, at the called party, a plurality of telephone numbers of the available channels and the number of telephone numbers in a bit-rate allocation signal code area in bit-rate allocation signal code form; and identifying information interchange controlling means for reading, at the first calling party, a piece of identifying information of the second channel selected from among the available channels from the bit-rate allocation signal controlling means as the particular identifying information of the second channel;

for reading, at the called party, a telephone number of the second channel selected from among the available channels from the bit-rate allocation signal controlling means as the particular telephone number of the second channel;

for storing, at the called party, the particular identifying information transmitted from the first calling party to the called party through the network interface means and the first channel; and for storing, at the first calling party, the particular telephone number transmitted from the called party to the first calling party through the network interface means and the first channel.

10. A visual communication terminal apparatus according to claim 6 wherein the particular identifying information prepared by the identifying information controlling means at the first calling party is a particular calling-telephone number of the second channel.

11. A visual communication terminal apparatus for communicating between a first calling party and a called party connected through a first channel, comprising at each called and calling party:

network interface means for transmitting, at the first calling party or at a second calling party, a call to the called party through a second channel differing from the first channel; and for receiving, at the called party, the call transmitted from the first calling party or the second calling party through the second channel;

call control processing means for preparing, at the first calling party or at the second calling party, the call transmitted to the called party;

for receiving, at the called party, the call prepared at the first calling party or at the second calling party through the second channel and the network interface means of the called party;

for disconnecting the call in cases where a release of the second channel is notified; and for establishing the call in cases where an establishment of the call is notified;

incoming-call judging means for judging, at the called party, whether or not the call received by the call control processing means of the called party is prepared by the first calling party;

incoming-call judgement controlling means for notifying the call control processing means of the called party of the release of the second channel in cases where the incoming-call judging means of the called party judges that the call received by the call control processing means of the called party is not prepared by the first calling party; and for notifying the call control processing means of the called party of the establishment of the call at the called party in cases where the incoming call judging means judges that the call received by the call control processing means of the called party is prepared by the first calling party; and information communicating means for transmitting, at the first calling party, one or more pieces of visual information to the called party through the network interface means and the first and second channels in cases where the call control processing means establishes the call transmitted through the second channel and for receiving, at the called party, the visual information from the first calling party through the network interface means and the first and second channels to perform a visual communication between the first calling party and the called party.

12. A visual communication terminal apparatus according to claim 11, wherein the information communicating means comprises:

codec means for coding, at the first calling party, an image signal and an audio signal indicating the visual information to produce a coded image signal and a coded audio signal, and for decoding, at the called party, the coded image signal and the coded audio signal to reproduce the image signal and the audio signal; and multiplexing/demultiplexing means for multiplexing the coded image signal and the coded audio signal produced by the codec means at the first calling party to transmit multiplexed coded image and audio signals to the called party through the network interface means and the first and second channels, and for demultiplexing, at the called party, the multiplexed coded image and audio signals transmitted from the first calling party through the network interface means and the first and second channels, the demultiplexed coded image and audio signals being decoded by the codec means.

13. A visual communication terminal apparatus for communicating between a calling party and a called party connected thereto through a first channel comprising, at each of said called party and said calling party:

network interface means;

call control processing means;

incoming-call judging means;

incoming-call judgement controlling means; and information communicating means, wherein:

said network interface means of said calling party operates for transmitting a further call to said called party connected thereto, through a second channel differing from said first channel; and said network interface means of said called party operates for receiving, through said second channel, the further call from the calling party;

said call control processing means of said called party operates for disconnecting a received call in response to notification to release said second channel; and said call control processing means of said called party further operates for establishing a received call through said second channel in response to notification to establish the call;

said incoming-call judging means of said called party operates for judging whether or not a call received by said network interface means of said called party through said second channel is said further call transmitted by said calling party;

said incoming-call judgement controlling means of said called party operates for notifying said call control processing means of said called party to release said second channel in response to judgment by said incoming-call judging means of said called party that the call received by said network interface means of said called party through said second channel is not said further call transmitted by said calling party; and said incoming-call judgement controlling means of said called party further operates for notifying said call control processing means of said called party to establish the received call on said second channel in response to judgment by said incoming call judging means of said called party that the call received by said network interface means of said called party through said second channel is said further call transmitted by said calling party;

said information communicating means of said calling party operates for transmitting one or more pieces of visual information to said called party through said network interface means of said calling party and through said first and second channels in response to establishment of the call through said second channel by said call control processing means of said called party; and said information communicating means of said calling party operates for receiving said one or more pieces of visual information from said calling party through said network interface means of said called party and through said first and second channels to perform a visual communication between said calling party and the called party.

14. A visual communication terminal apparatus according to claim 13, wherein:

said network interface means of said calling party further operates for transmitting to said called party, through said first channel, a piece of particular identifying information of said second channel;

said network interface means of said called party operates for receiving the piece of particular identifying information of said second channel transmitted from said calling party through said first channel; and further comprising, at each called and calling party, identifying information controlling means;

said identifying information controlling means of said called party operating for storing, at said called party, the piece of particular identifying information of said second channel transmitted from said calling party to said called party through said first channel;

wherein said incoming-call judging means of said called party judges whether or not a call received by the call control processing means of the called party is the further call transmitted from said calling party by comparing a received piece of identifying information of the second channel in the received call with the piece of particular identifying information of the second channel stored in said identifying information controlling means of said called party; and by judging that the received call is the further call transmitted by said calling party when the received piece of identifying information included in the received call agrees with the piece of particular identifying information stored in said identifying information controlling means of said called party.

15. A visual communication performing method for communicating between a first calling party and a called party connected through a first channel, comprising the steps of:

transmitting, from the first calling party to the called party through the first channel, a piece of particular identifying information of a second channel differing from the first channel;

transmitting to the called party through the second channel a call from the first calling party including the piece of particular identifying information or a call from a second calling party including a piece of general identifying information;

judging whether or not received identifying information of the call transmitted to the called party through the second channel agrees with the piece of particular identifying information transmitted from the first calling party through the first channel;

releasing the second channel to disconnect the second channel between the called party and the second calling party in cases where the received identifying information does not agree with the piece of particular identifying information;

establishing the call by connecting the second channel between the called party and the first calling party in cases where the received identifying information agrees with the piece of particular identifying information; and transmitting one or more pieces of visual information from the first calling party to the called party to perform a visual communication between the first calling party and the called party through the first and second channels in cases where the call is established.

* * * * *